(12) United States Patent
Nakamura

(10) Patent No.: US 7,418,027 B2
(45) Date of Patent: Aug. 26, 2008

(54) METHOD AND APPARATUS FOR ULTRA WIDEBAND COMMUNICATIONS SYSTEM EMPLOYING A SPREAD SPECTRUM TECHNIQUE TRANSMITTING A BASEBAND SIGNAL OVER A WIDE FREQUENCY BAND

(75) Inventor: Masaru Nakamura, Kanagawa-ken (JP)

(73) Assignee: Ricoh Company, Ltd. (JP)

( * ) Notice: Subject to any disclaimer, the term of this patent is extended or adjusted under 35 U.S.C. 154(b) by 874 days.

(21) Appl. No.: 10/702,772

(22) Filed: Nov. 7, 2003

(65) Prior Publication Data

US 2004/0141546 A1 Jul. 22, 2004

(30) Foreign Application Priority Data

Nov. 12, 2002 (JP) ............................. 2002-328637
May 30, 2003 (JP) ............................. 2003-155197

(51) Int. Cl.
*H04B 1/00* (2006.01)
(52) U.S. Cl. ...................................................... 375/141
(58) Field of Classification Search ................ 375/130, 375/140, 141, 146–147, 259, 285, 295, 316; 370/335, 342, 350
See application file for complete search history.

(56) References Cited

U.S. PATENT DOCUMENTS

| | | | |
|---|---|---|---|
| 5,835,489 A * | 11/1998 | Moriya et al. ............... | 370/342 |
| 6,088,583 A * | 7/2000 | Shimizu et al. ........... | 455/235.1 |
| 6,289,036 B1 * | 9/2001 | Saito et al. ................... | 375/130 |
| 6,731,671 B2 * | 5/2004 | Ozluturk ...................... | 375/140 |
| 6,833,770 B1 * | 12/2004 | Fukumoto et al. ........... | 332/103 |
| 7,082,153 B2 * | 7/2006 | Balachandran et al. ...... | 375/138 |
| 2001/0053178 A1 * | 12/2001 | Yano et al. ................... | 375/150 |
| 2002/0146080 A1 * | 10/2002 | Dress et al. .................. | 375/316 |
| 2002/0167991 A1 * | 11/2002 | Suzuki ........................ | 375/130 |

FOREIGN PATENT DOCUMENTS

| | | |
|---|---|---|
| JP | 05-252134 | 9/1993 |
| JP | 6-252888 | 9/1994 |
| JP | 09-055685 | 2/1997 |
| JP | 11-504480 | 4/1999 |
| JP | 2000-165295 | 6/2000 |
| JP | 2000-252868 | 9/2000 |
| JP | 2002-261656 | 9/2002 |

* cited by examiner

*Primary Examiner*—Khanh C Tran
(74) *Attorney, Agent, or Firm*—Dickstein Shapiro LLP

(57) ABSTRACT

A transmitter for ultra wideband communications includes a spread modulator for spreading input data to a wideband signal having a form in which a plurality of carriers are constantly transmitted and a amplifier for amplifying the spread signal obtained from the spread modulator. The amplified signal obtained from the amplifier is transmitted as a baseband signal by one of a wired and wireless transmission.

25 Claims, 9 Drawing Sheets

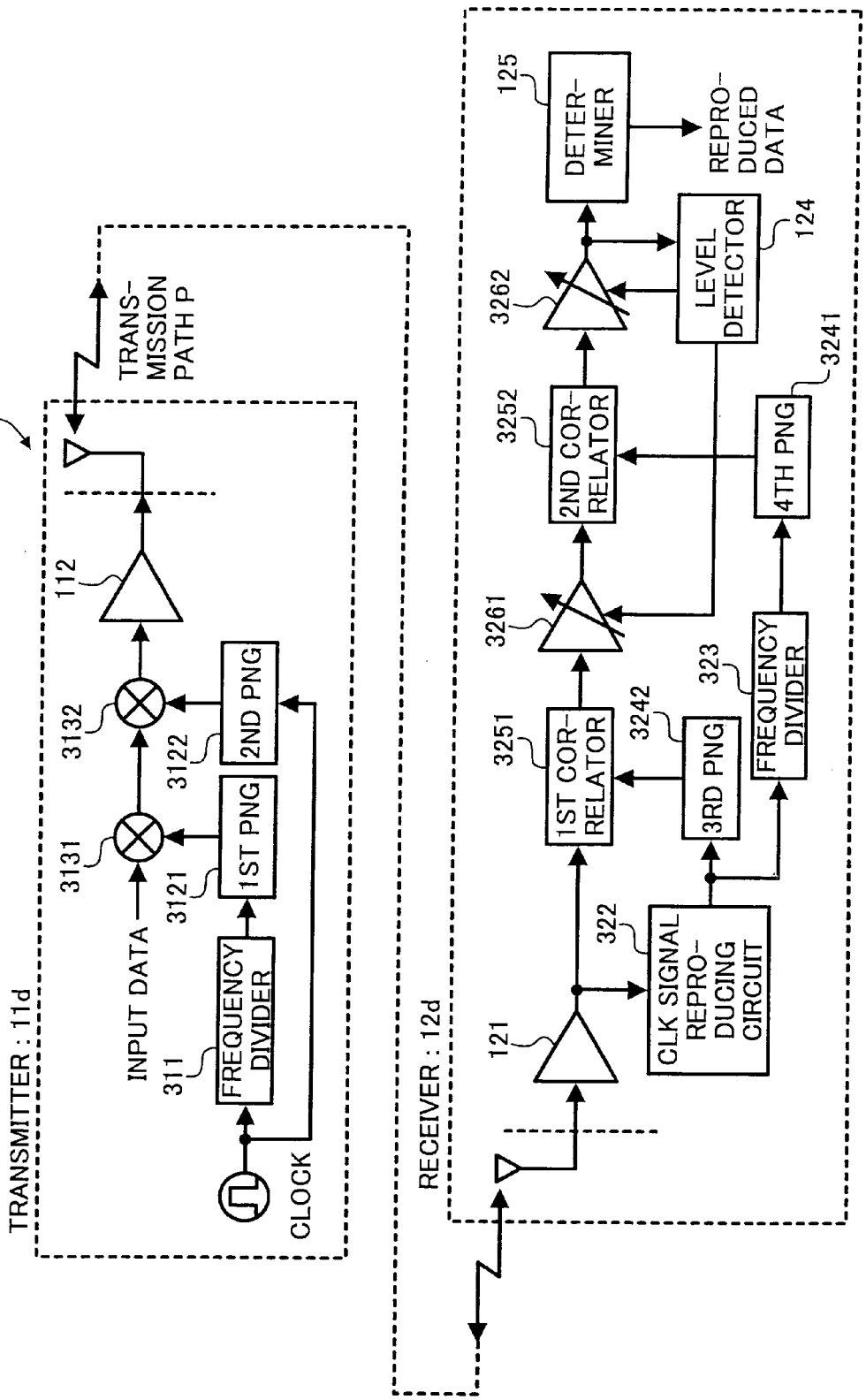

METHOD AND APPARATUS FOR ULTRA WIDEBAND COMMUNICATIONS SYSTEM EMPLOYING A SPREAD SPECTRUM TECHNIQUE TRANSMITTING A BASEBAND SIGNAL OVER A WIDE FREQUENCY BAND

BACKGROUND

The present application claims priority to Japanese patent application nos. JPAP 2002-328637, filed in the Japanese Patent Office on Nov. 12, 2002, and JPAP 2003-155197, filed in the Japanese Patent Office on May 30, 2003, the entire contents of which are incorporated by reference herein.

1. Field of the Invention

The present invention relates to a method and apparatus for an ultra wideband communications system employing a spread spectrum technique transmitting a baseband signal over a wide frequency band. Specifically, the present invention relates to a transmitter for ultra wideband communications in which input data is spread by a spread modulator to a wideband signal having a form in which a plurality of carriers are constantly transmitted as baseband signals by wired or wireless transmission, and a method of producing the input data in the transmitter. The present invention also relates to a receiver for ultra wideband communications for reproducing a received signal, and a method of reproducing the received signal to original data in the receiver. The present invention also relates to an ultra wideband communications system including the above-described transmitter and the above-described receiver, and a communications method using the above-described method of producing the input data and the above-described method of reproducing the original data.

2. Description of the Related Art

Conventional communications technologies have effectively utilized limited frequency resources by minimizing use of a frequency bandwidth. That is, the conventional communications technologies have generally used frequency in a narrow bandwidth. However, as the width of a frequency band becomes narrower, tolerance for noise in a communications path and for coherency from signal distortion affected by another signal of another channel are more deteriorated, and thereby, data signals become more susceptible to interference. As a result, the data signals may be unnecessarily transmitted using an extra bandwidth of a communication path.

To eliminate the problem as described above, an ultra wideband communications technique using a baseband signal for an ultra wideband is commonly used. The baseband signal represents a signal having information such as audio, video or digital data. With this technique, communication is made via a communication path having strong attenuation, such as a radio-frequency transmission path and an asymmetric digital subscriber line known as ADSL.

In the ultra wideband communications technique, data is spread to a 1 GHz frequency bandwidth, for example, to transmit and receive the data. A system including the ultra wideband communications technique can produce a considerably large spectrum over a wide bandwidth, which is generally over several hundred KHz through several MHz. Therefore, the density of the spectrum becomes low, and the communication is hardly affected from other communications performed in the same frequency band at the same time. Additionally, even when the communications collide with other communications, a strong error correction code, added to the data, is used to correct the error.

By transmitting a spectrum having low density spread over a wide frequency bandwidth, the ultra wideband communications technique has the following advantages:

(1) Allows a plurality of parallel communications simultaneously in a same frequency band;
(2) Provides less or no adverse effect to other channels;
(3) Hardly affected by noise or interference from other nodes; and
(4) Has high privacy protection since the transmission is hardly traced or detected.

One of the popular techniques of ultra wideband communications is direct sequence spread spectrum (hereinafter, referred to as "DS-SS"). In the DS-SS, a data signal is multiplied by a pseudo random noise code having a fixed bandwidth so that a frequency bandwidth of a stream of input signal data is spread, modulated and transmitted.

Namely, a transmitter using the DS-SS modulates a digital signal (i.e., input data) having a narrow bandwidth and high power density to a signal having a wide bandwidth and low power density by adding a spread spectrum code with a large bit rate. A receiver detects a signal having a same stream of the input signal data as the pseudo noise code among received waves, and then reproduces the original data.

The ultra wideband communication has another communications technique using an impulse, which can be produced with a simple circuit as described in a reference of Japanese Patent Application Publication No. Kou-Hyo 11-504480, for example. Since the impulse is a flash signal and has an extremely wide frequency spectrum, negative influence to other frequency bands may effectively be reduced.

However, according to Japanese Patent Application Publication No. Kou-Hyo 11-504480, since the impulse produces signals having large power at the moment the impulse is emitted, negative influence is given to other signals.

SUMMARY

The present invention has been made in view of the above circumstances and provides an ultra wideband communications technology, wherein a modulation and demodulation technique of constantly transmitting a plurality of carriers in a wide frequency bandwidth is employed for a baseband communication using an ultra wideband and an automatic gain control amplifier having a wide dynamic range is provided to a stage after a despread demodulation operation is performed, so as to reduce negative influence to other radio waves.

Namely, it is an object of the present invention to provide a transmitter for ultra wideband communications in which input data is spread by a spread modulator to a wideband signal having a form in which a plurality of carriers are constantly transmitted and is transmitted as a baseband signal by wired or wireless transmission.

It is another object of the present invention to provide a method of producing the input data in the transmitter.

It is another object of the present invention to provide a receiver for ultra wideband communications for reproducing a received signal.

It is another object of the present invention to provide a method of reproducing the received signal to original data in the receiver.

It is another object of the present invention to provide an ultra wideband communications system including the transmitter and the receiver.

It is another object of the present invention to provide a communications method using the method of producing the input data and the method of reproducing original data.

In one example, a transmitter for ultra wideband communications includes a spread modulator and an amplifier. The spread modulator spreads original input data to a wideband signal. The wideband signal has a form in which a plurality of carriers are constantly transmitted. The amplifier amplifies the spread wideband signal obtained from the spread modulator. The amplified signal obtained from the amplifier may be transmitted as a baseband signal by wired or wireless transmission.

In one example, a receiver for ultra wideband communications includes a low-gain amplifier, despread demodulator, an automatic gain control amplifier and a determiner. The low-gain amplifier amplifies a spread signal received from an external transmitter to a predetermined gain level. The despread demodulator despreads the amplified signal obtained from the low-gain amplifier. The automatic gain control amplifier has a wide dynamic range and amplifies the despread signal obtained from the despread demodulator to a signal having a constant amplitude level. The determiner processes the amplified signal obtained from the automatic gain control amplifier to reproduce original input data contained in the spread signal.

In this example, the above-described receiver may further include a high pass filter and a low pass filter. The high pass filter blocks an information signal band at an input terminal of the despread demodulator. The low pass filter passes the information signal band at an output terminal of the despread demodulator.

In one example, a method of producing an input signal for ultra wideband communications includes spreading original input data to a wideband signal, and amplifying the spread wideband signal. The wideband signal has a form in which a plurality of carriers are constantly transmitted.

In one example, a method of reproducing original data for ultra wideband communications includes amplifying a spread signal received from an external transmitter to a predetermined gain level, despreading the amplified signal, amplifying the despread signal to a signal having a constant level of amplitude, and reproducing original input data based on the amplified signal having the constant level of amplitude.

In this example, the above-described method may further include the steps of performing a high pass filtering operation for blocking an information signal band of the original data before the demodulating step, and performing a low pass filtering operation for passing an information signal band after the demodulating step.

In one example, a ultra wideband communications system includes a transmitter and a receiver for ultra wideband communications. The transmitter includes a spread modulator and an amplifier. The spread modulator spreads original input data to a wideband. The amplifier amplifies the spread wideband signal obtained from the spread modulator. The amplified signal obtained from the amplifier is transmitted as a baseband signal by wired or wireless transmission. The receiver includes a low-gain amplifier, a despread modulator, an automatic gain control amplifier and a determiner. The low-gain amplifier amplifies a spread signal received from an external transmitter to a predetermined gain level. The despread demodulator despreads the amplified signal obtained from the low-gain amplifier. The automatic gain control amplifier has a wide dynamic range and amplifies the despread signal obtained from the despread demodulator to a signal having a constant amplitude. The determiner processes the amplified signal obtained from the automatic gain control amplifier to reproduce original input data contained in the spread signal received from the external transmitter.

In one example, a method for performing ultra wideband communications includes spreading original input data to a wideband signal, amplifying the spread wideband signal, transmitting the amplified signal obtained from the amplifying step as a baseband signal by wired or wireless transmission, receiving the transmitted signal, amplifying the transmitted signal to a predetermined gain level, despreading the amplified signal, amplifying the despread signal to a signal having a constant level of amplitude, and reproducing the original input data based on the amplified signal having the constant level of amplitude.

In this example, electric power is leveled by constantly transmitting a plurality of carriers instead of impulses. Leveling of electric power may generally imply a substantially low signal level and negative influence suffered from signals in other narrow bands. The receiver in this embodiment causes the receive low-gain amplifier provided at the first stage in the receiver to amplify a received input signal to a level in which a SN (signal-to-noise) ratio is not deteriorated. Therefore, the amplified signal may be hardly affected by the signals in other narrow bands.

Further, in this example, the automatic gain control (AGC) amplifier having a wide dynamic range is provided at a stage after the despread demodulator to amplify and demodulate a desired low-level signal. Namely, the despread demodulator despreads an interference signal interfering in the transmission path and then the AGC amplifier having a wide dynamic range amplifies the interference signal. Therefore, compared to a method in which an AGC amplifier is provided at a stage before the despread processing, the demodulated signal is not distorted by the interference signal and the receiving sensitivity is improved.

Further, in one example, a ultra wideband communications system uses a DS-SS technique in which a pseudo noise code is simply multiplied by a transmission signal.

In this example, the spread modulator and the despread demodulator are replaced with a modulator and a demodulator using the DS-SS technique, respectively. A transmitter of this example multiplies a pseudo noise code obtained from a pseudo noise code generator to perform modulation in a DS-SS manner. Further, a receiver of this example may use a commonly known synchronized clock signal reproducing circuit, for example, as a clock signal reproducing circuit of the receiver.

In one example, a transmitter for ultra wideband communications includes a pseudo noise code generator, a multiplier and an amplifier. The pseudo noise code generator generates a pseudo noise code according to an input clock signal. The multiplier multiplies original input data by the pseudo noise code and produces a spread signal. The amplifier amplifies the spread signal. The amplified signal obtained from the amplifier is transmitted as a baseband signal by wired or wireless transmission.

In one example, a receiver for ultra wideband communications includes a low-gain amplifier, clock signal reproducing circuit, pseudo noise code generator, correlator, an automatic gain control amplifier and a determiner. The low-gain amplifier amplifies a spread signal received from an external transmitter to a predetermined gain level. The clock signal reproducing circuit reproduces an input clock signal based on the amplified spread signal obtained from the low-gain amplifier. The pseudo noise code generator generates a pseudo noise code based on the reproduced input clock signal obtained from the clock signal reproducing circuit. The correlator demodulates the amplified spread signal obtained from the low-gain amplifier according to the pseudo noise code generated by the pseudo noise code generator. The automatic gain control amplifier amplifies the demodulated signal obtained from the correlator to a signal having a wide dynamic range and a constant amplitude level. The determiner processes the amplified signal obtained from the automatic gain control amplifier to reproduce original input data contained in the spread signal.

In this example, the above-described receiver may further include first and second high pass filters and a low pass filter. The first high pass filter receives the amplified spread signal and blocks an information signal band at an input terminal of the correlator. The second high pass filter receives the pseudo noise code and blocks an information signal band at the input terminal of the correlator. The low pass filter passes the information signal band at an output terminal of the correlator.

In one example, a method of producing a transmission signal for ultra wideband communications includes generating a pseudo noise code according to an input clock signal, multiplying original input data by the pseudo noise code and producing a spread signal, amplifying the spread signal.

In one example, a method of reproducing original data for ultra wideband communications includes amplifying a spread signal received from an external transmitter, reproducing an input clock signal based on the amplified spread signal, generating a pseudo noise code based on the reproduced input clock signal, demodulating the amplified spread signal according to the pseudo noise code, amplifying the demodulated signal automatically to a signal having a constant level of amplitude, and reproducing original input data based on the amplified signal having the constant level of amplitude.

In this example, the above-described method may further include performing a first high pass filtering operation for blocking an information signal band of the original input data with respect to the amplified spread signal, performing a second high pass filtering operation for blocking the information signal band of the original input data with respect to the pseudo noise code, and performing a low pass filtering operation for passing the information signal band of the original input data with respect to the demodulated spread signal.

In one example, a ultra wideband communications system includes a transmitter and a receiver. The transmitter includes a pseudo noise code generator, multiplier, and an amplifier. The pseudo noise code generator generates a pseudo noise code according to an input clock signal. The multiplier multiplies original input data by the pseudo noise code and produces a spread signal. The amplifier amplifies the spread signal. The amplified signal obtained from the amplifier is transmitted as a baseband signal by wired or wireless transmission. The receiver includes a low-gain amplifier, clock signal reproducing circuit, pseudo noise code generator, correlator, an automatic gain control amplifier and a determiner. The low-gain amplifier amplifies a spread signal received from an external transmitter to a predetermined gain level. The clock signal reproducing circuit reproduces an input clock signal based on the amplified spread signal obtained from the low-gain amplifier. The pseudo noise code generator generates a pseudo noise code based on the reproduced input clock signal obtained from the clock signal reproducing circuit. The correlator demodulates the amplified spread signal obtained from the low-gain amplifier according to the pseudo noise code generated by the pseudo noise code generator. The automatic gain control amplifier amplifies the demodulated signal obtained from the correlator to a signal having a wide dynamic range and a constant amplitude level. The determiner processes the amplified signal obtained from the automatic gain control amplifier to reproduce original input data contained in the spread signal received from the external transmitter.

In one example, a method of performing ultra wideband communications includes generating a pseudo noise code according to an input clock signal, multiplying original input data by the pseudo noise code and producing a spread signal, amplifying the spread signal, transmitting the amplified spread signal as a baseband signal by wired or wireless transmission, receiving the transmitted spread signal, amplifying the transmitted spread signal to a predetermined gain level, reproducing the input clock signal based on the amplified spread signal, generating a pseudo noise code based on the reproduced input clock signal, demodulating the amplified spread signal according to the pseudo noise code, amplifying the demodulated signal to a signal having a constant amplitude level, and reproducing original input data based on the amplified signal having the constant amplitude level.

In this example, electric power is leveled by constantly transmitting a plurality of carriers instead of impulses. Leveling of electric power may generally imply a substantially low signal level and negative influence suffered from signals in other narrow bands. The receiver in this example also causes the receive low-gain amplifier provided at the first stage in the receiver to amplify a received input signal to a level in which a SN (signal to noise) ratio is not deteriorated. Therefore, the amplified signal may be hardly affected by the signals in other narrow bands.

In this example, the automatic gain control (AGC) amplifier has a wide dynamic range and is provided at a stage after the despread demodulator to amplify and demodulate a desired low-level signal. Namely, the despread demodulator despreads an interference signal causing interference in the transmission path and then the AGC amplifier having a wide dynamic range amplifies the interference signal. Therefore, compared to a method in which an AGC amplifier is provided at a stage before the despread processing, the demodulated signal is not distorted by the interference signal and the receiving sensitivity is improved.

Further, in one example, a ultra wideband communications system uses the DS-SS technique.

In this example, the spread modulator and the despread demodulator are also replaced with a modulator and a demodulator using the DS-SS technique, respectively. This example employs modified processing techniques so that spread modulation and despread demodulation are performed in two steps. The transmitter uses a frequency divider to change drive clock signals of the first and second pseudo noise code generators, a first pseudo noise code generator to primarily spread a transmission signal over a certain bandwidth, and a second pseudo noise code generator to secondarily spread the signal, to produce a ultra wideband signal. The receiver also performs despread processing in two steps, and uses an automatic gain control amplifier to amplify the signal after the despread processing. Therefore, even though a high gain generates oscillation due to noise, a low-level signal can stably be demodulated by dividing the gain in two steps.

In one example, a transmitter for ultra wideband communications includes a frequency divider, first pseudo noise code generator, second pseudo noise code generator, first multiplier, second multiplier and an amplifier. The frequency divider divides a frequency of an input clock signal. The first pseudo noise code generator generates a first pseudo noise code according to the frequency-divided input clock signal obtained from the frequency divider. The second pseudo noise code generator generates a second pseudo noise code according to the input clock signal. The first multiplier multiplies original input data by the first pseudo noise code and produces a primary spread signal. The second multiplier multiplies the primary spread signal by the second pseudo noise code and produces a secondary spread signal. The amplifier amplifies the secondary spread signal. The amplified signal obtained from the amplifier is transmitted as a baseband signal by wired or wireless transmission.

In this example, the above-described transmitter may further include a high pass filter for blocking an information signal band of the original input data in one of stages before and after the amplifier.

In one example, a receiver for ultra wideband communications includes a low-gain amplifier, clock signal reproducing circuit, first pseudo noise code generator, frequency divider, second pseudo noise code generator, first correlator, first automatic gain control amplifier, second correlator, second automatic gain control amplifier and a determiner. The low-gain amplifier amplifies a spread signal received from an external transmitter to a predetermined gain level. The clock signal reproducing circuit reproduces an input clock signal based on the amplified spread signal obtained from the low-gain amplifier. The first pseudo noise code generator generates a first pseudo noise code based on the reproduced input clock signal obtained from the clock signal reproducing circuit. The frequency divider divides a frequency of the reproduced input clock signal obtained from the clock signal reproducing circuit. The second pseudo noise code generator generates a second pseudo noise code based on the frequency-divided input clock signal obtained from the frequency divider. The first correlator performs primary demodulation to the amplified spread signal obtained from the low-gain amplifier based on the first pseudo noise code. The first automatic gain control amplifier amplifies the primary demodulated signal obtained from the first correlator. The second correlator performs secondary demodulation to the amplified signal obtained from the first automatic gain control amplifier based on the second pseudo noise code. The second automatic gain control amplifier amplifies the secondary demodulated signal obtained from the second correlator to a signal having a constant level. The determiner processes the amplified signal obtained from the second automatic gain control amplifier to reproduce original input data contained in the spread signal received from the external transmitter.

In this example, the above-described receiver may further include four high pass filters and two low pass filters. The first high pass filter receives the amplified signal obtained from the low-gain amplifier and blocks an information signal band of the original input data which has been processed through a primary spreading at an input terminal of the first correlator. The second high pass filter receives the pseudo noise code obtained from the first pseudo noise code generator and blocks the information signal band of the original input data which has been processed through the primary spreading at the input terminal of the first correlator. The first low pass filter passes the information signal band of the original input data which has been processed through the primary spreading at an output terminal of the first correlator. The third high pass filter receives the amplified signal obtained from the first automatic gain control amplifier and blocks the information signal band of the original input data before the primary spreading at an input terminal of the second correlator. The fourth high pass filter receives the pseudo noise code obtained from the second pseudo noise code generator and blocks the information signal band of the original input data before the primary spreading at the input terminal of the second correlator. The second low pass filter passes the information signal band of the original input data before the primary spreading at an output terminal of the second correlator.

In one example, a method of producing an input signal for ultra wideband communications includes dividing a frequency of an input clock signal, generating a first pseudo noise code according to the frequency-divided input clock signal, generating a second pseudo noise code according to the input clock signal, multiplying original input data by the first pseudo noise code and producing a primary spread signal, multiplying the primary spread signal by the second pseudo noise code and producing a secondary spread signal, and amplifying the secondary spread signal.

In this example, the above-described method may further include performing a high pass filtering operation for blocking an information signal band of the original input data in one of stages before and after the amplifier for amplifying the secondary spread signal.

In one example, a method of reproducing original data for ultra wideband communications includes amplifying a spread signal received from an external transmitter, reproducing an input clock signal based on the amplified spread signal, generating a first pseudo noise code based on the reproduced input clock signal, dividing a frequency of the reproduced input clock signal, generating a second pseudo noise code based on the frequency-divided input clock signal, performing primary demodulation to the amplified spread signal based on the first pseudo noise code, amplifying the primary demodulated signal, performing secondary demodulation to the amplified signal based on the second pseudo noise code, amplifying the secondary demodulated signal to a signal having a constant level, and reproducing original input data based on the amplified signal having a constant level of amplitude.

In one example, a method of reproducing original data for ultra wideband communications includes performing a first high pass filtering operation for blocking an information signal band of the original input data which has been processed through a primary spreading with respect to the input secondary spread signal, performing a second high pass filtering operation for blocking the information signal band of the input data which has been processed through the primary spreading with respect to a first pseudo noise code, performing a first low pass filtering operation for passing the information signal band of the original input data which has been processed through the primary spreading with respect to a primary demodulated signal demodulated based on the outputs from the first and second high pass filtering operations, performing a third high pass filtering operation for blocking the information signal band of the original input data before the primary spreading with respect to an output from the second amplifying means, performing a fourth high pass filtering operation for blocking the information signal band of the original input data before the primary spreading with respect to a second pseudo noise code, and performing a second low pass filtering operation for passing the information signal band of the original input data before the primary spreading with respect to the secondary demodulated signal based on the outputs from the third and fourth high pass filtering operations.

In one example, a ultra wideband communications system includes a transmitter and a receiver for ultra wideband communications. The transmitter includes a frequency divider, first and second pseudo noise code generators, first and second multipliers, and an amplifier. The frequency divider divides a frequency of an input clock signal. The first pseudo noise code generator generates a first pseudo noise code according to the frequency-divided input clock signal obtained from the frequency divider. The second pseudo noise code generator generates a second pseudo noise code according to the input clock signal. The first multiplier multiplies original input data by the first pseudo noise code and producing a primary spread signal. The second multiplier multiplies the primary spread signal by the second pseudo noise code and produces a secondary spread signal. The amplifier amplifies the secondary spread signal. The amplified signal obtained from the amplifier is transmitted as a baseband signal by wired or wireless transmission. The receiver includes a low-gain amplifier, clock signal reproducing circuit, first and second pseudo noise code generators, a frequency divider, first and second correlators, first and second automatic gain control amplifiers and a determiner. The low-gain amplifier amplifies a spread signal received from an external transmitter to a predetermined gain level. The clock signal reproducing circuit reproduces an input clock signal based on the amplified spread signal obtained from the low-gain amplifier. The first pseudo noise code generator generates a first pseudo noise code based on the reproduced input clock signal obtained from the clock signal reproducing circuit. The frequency divider divides a frequency of the reproduced input clock signal obtained from the clock signal reproducing circuit. The second pseudo noise code generator generates a second pseudo noise code based on the frequency-divided input clock signal obtained from the frequency divider. The first correlator performs primary demodulation to the amplified spread signal obtained from the low-gain amplifier based on the first pseudo noise code. The first automatic gain control amplifier amplifies the primary demodulated signal obtained from the first correlator. The second correlator performs secondary demodulation to the amplified signal obtained from the first automatic gain control amplifier based on the second pseudo noise code. The second automatic gain control amplifier amplifies the secondary demodulated signal obtained from the second correlator to a signal having a constant level. The determiner determines the amplified signal obtained from the second automatic gain control amplifier and reproduces original input data contained in the spread signal received from the external transmitter.

In one example, a method of performing ultra wideband communications includes dividing a frequency of an input clock signal, generating a first pseudo noise code according to the frequency-divided input clock signal, generating a second pseudo noise code according to the input clock signal, multiplying original input data by the first pseudo noise code and producing a primary spread signal, multiplying the primary spread signal by the second pseudo noise code and producing a secondary spread signal, amplifying the secondary spread signal, transmitting the amplified secondary spread signal obtained from the amplifying step as a baseband signal by wired or wireless transmission, receiving the transmitted signal, amplifying the transmitted spread signal to a predetermined gain level, reproducing the input clock signal based on the amplified spread signal, generating a first pseudo noise code according to the reproduced input clock signal, dividing a frequency of the reproduced input clock signal, generating a second pseudo noise code based on the frequency-divided input clock signal, performing primary demodulation to the amplified spread signal based on the first pseudo noise code, amplifying the primary demodulated signal, performing secondary demodulation to the amplified signal based on the second pseudo noise code, amplifying the secondary demodulated signal to a signal having a constant level, and reproducing original input data based on the amplified signal having a constant level of amplitude.

In this example, electric power is leveled by constantly transmitting a plurality of carriers instead of impulses. Leveling of electric power may generally imply a substantially low signal level and negative influence suffered from signals in other narrow bands. The receiver in this example also causes the receive low-gain amplifier provided at the first stage in the receiver to amplify a received input signal to a level in which a SN (signal-to-noise) ratio is not deteriorated. Therefore, the amplified signal may be hardly affected by the signals in other narrow bands.

In this example, the automatic gain control (AGC) amplifier has a wide dynamic range and is provided at a stage after the despread demodulator to amplify and demodulate a desired low-level signal. Namely, the despread demodulator despreads an interference signal interfering in the transmission path and then the AGC amplifier having a wide dynamic range amplifies the interference signal. Therefore, compared to a method in which an AGC amplifier is provided at a stage before the despread processing, the demodulated signal is not distorted by the interference signal and the receiving sensitivity is improved.

The transmitter for ultra wideband communications in the above-described examples may arbitrarily have three or more processing stages for spread modulation. The receiver for ultra wideband communications in the above-described examples may also arbitrarily have three or more processing stages for spread modulation.

BRIEF DESCRIPTION OF THE DRAWINGS

The foregoing and other advantages and features of the invention will become more apparent from the detailed description of exemplary embodiments provided below with reference to the accompanying drawings, in which:

FIG. 7 is an illustration showing a communications system according to another exemplary embodiment performing modulation and demodulation in two steps based on the communications system of FIG. 5.

DETAILED DESCRIPTION

In the following detailed description, reference is made to the accompanying drawings, which are a part of the specification, and in which is shown by way of illustration various embodiments whereby the invention may be practiced. These embodiments are described in sufficient detail to enable those skilled in the art to make and use the invention. It is to be understood that other embodiments may be utilized, and that structural, logical, and electrical changes, as well as changes in the materials used, may be made without departing from the spirit and scope of the present invention.

Figure 1:
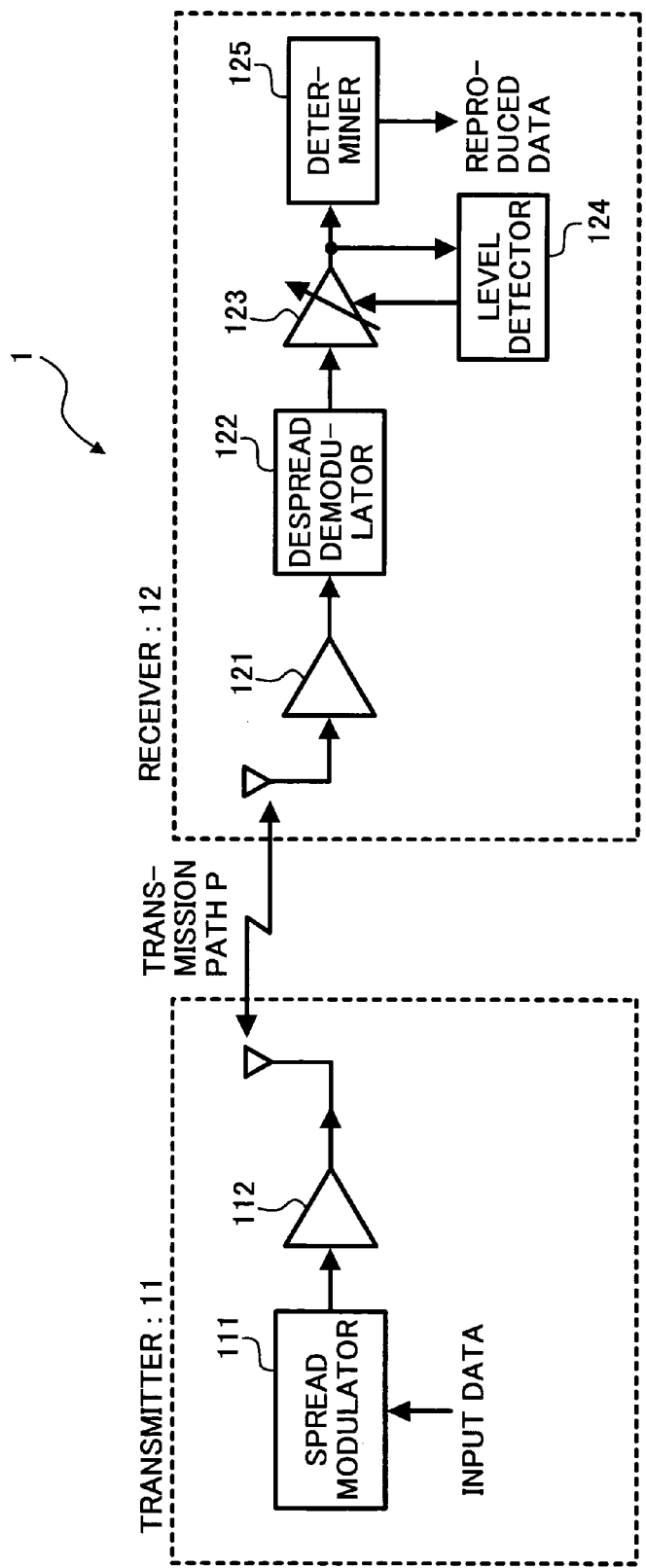
FIG. 1 is an illustration showing a communications system according to an exemplary embodiment of the present invention.

Referring now to the drawings, wherein like reference numerals designate identical or corresponding parts throughout the several views, FIG. 1 show a communications system 1 according to an exemplary embodiment of the present invention.

As shown in FIG. 1, the communications system 1 includes a transmitter 11 and a receiver 12. The transmitter 11 includes a spread modulator 111 to which input data is input and an amplifier 112.

The receiver 12 includes a low-gain amplifier 121, despread demodulator 122, an automatic gain control (AGC) amplifier 123, a level detector 124 and a determiner 125. The determiner 125 outputs demodulated original data.

The transmitter 11 and the receiver 12 are connected via a transmission path P.

In the transmitter 11, the spread modulator 111 spreads input data, which is a baseband signal, to a wideband signal. The wideband signal has a form in which a plurality of carriers are constantly transmitted. The amplifier 112 amplifies the spread wideband signal to transmit the signal as a baseband signal on a wireless transmission basis. The transmission from the transmitter 11 to the receiver 12 may also be made using cables, such as those used in a PSTN (Public Switched Telephone Network), an ISDN (Integrated Services Digital Network), a LAN (Local Area Network), a WAN (Wide Area Network), or other similar network or communications system.

In the receiver 12, the low-gain amplifier 121 receives the spread signal from the amplifier 112 of the transmitter 11 and amplifies the signal to a level in which a SN ratio is not deteriorated. Then, the despread demodulator 122 despreads the amplified signal. The automatic gain control amplifier 123, having a wide dynamic range, amplifies the despread signal to a signal having a constant amplitude level. The determiner 125 processes the signal and regenerates original input data. The received spread signal is amplified by the low-gain amplifier 121 to the level not affecting the SN ratio. Additionally, an interference signal that interferes the data through the transmission path P is despread by the despread demodulator 122 and is amplified by the automatic gain control amplifier 123 having the wide dynamic range. Therefore, the technique used in this embodiment prevents the despread signal from being distorted due to the interference signal, compared to a technique in which the data is processed by the automatic gain control amplifier 123 before reaching the despread demodulator 122. As a result, the receiving sensitivity is increased.

FIGS. 2A-2D show signal spectra generated through the spread modulation and demodulation operations performed by the communications system 1 shown in FIG. 1. In FIGS. 2A-2D, a horizontal line indicates frequency and a vertical line indicates energy spectral density.

Figure 2A:
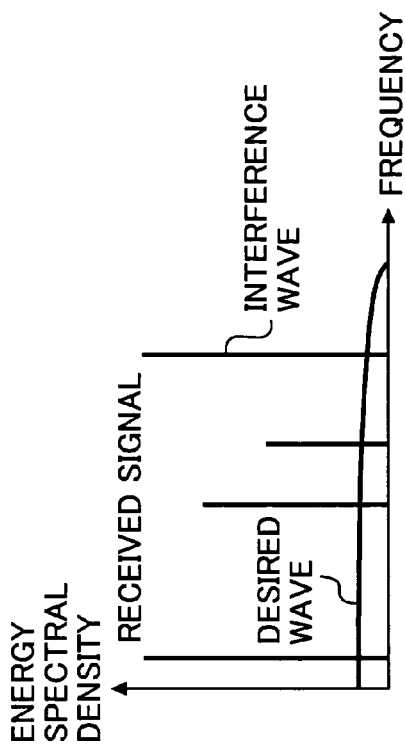
FIGS. 2A-2D are graphs showing spectra generated in exemplary operations of the communications system shown in FIG. 1.
Figure 2B:
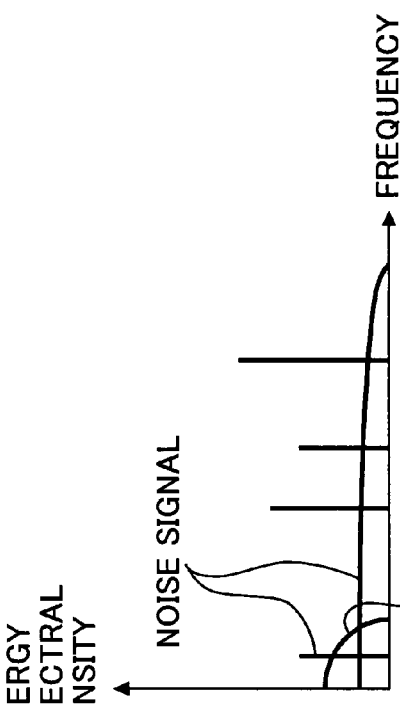
Figure 2C:
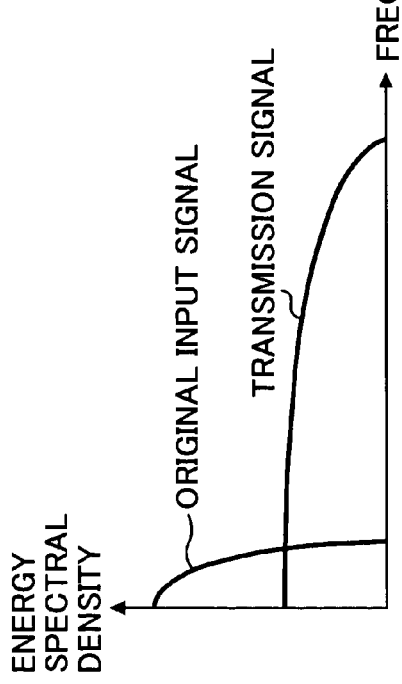
Figure 2D:
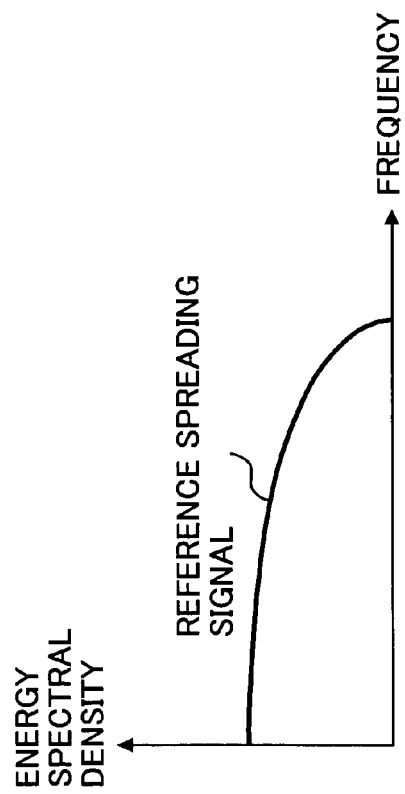

FIG. 2A shows a signal spectrum obtained at an output end of the amplifier 112 of the transmitter 11. FIG. 2B shows a signal spectrum obtained at an input end of the despread demodulator 122. FIG. 2C shows a spectrum of a reference spreading signal in the despread demodulator 122. FIG. 2D shows a spectrum of a signal which correlates to the original input data and is obtained at an output end of the despread demodulator 122.

In the communications system 1, the transmitter 11 spreads a data signal of a narrow band and transmits the spread signal as a transmission signal. By the time the signal reaches the receiver 12, the signal contains interference waves and noise in addition to a desired wave. Therefore, as shown in FIG. 2D, a desired correlated output signal may be affected by the received signal and the reference spreading signal at an output end of the receiver 12.

Figure 3:
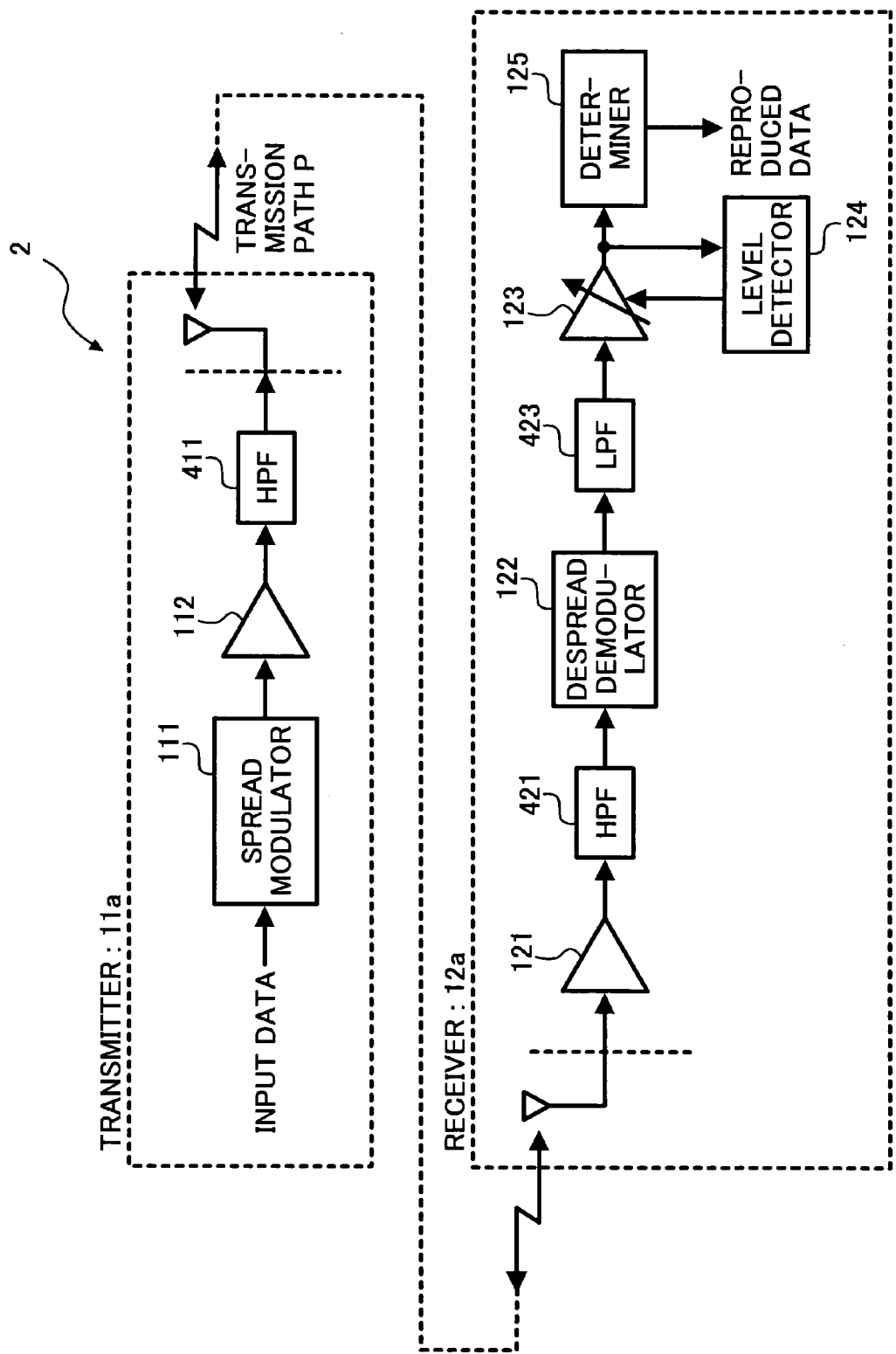
FIG. 3 is an illustration showing a communications system according to another exemplary embodiment having further improved receiving sensitivity based on the communications system of FIG. 1.

Referring to FIG. 3, a communications system 2 according to another exemplary embodiment is now described. The communications system 2 of FIG. 3 is similar to the communications system 1 (FIG. 1), except for high pass filters (hereinafter, referred to as "HPF") 411 and 421 and a low pass filter (hereinafter, referred to as "LPF") 423. In FIG. 3, the HPF 411 is provided to a stage after the amplifier 112 of the transmitter 11a to block an information signal band which is a band covering the input data. The HPF 411 may be provided to a stage before the amplifier 112 of the transmitter 11a. In FIG. 3, the HPF 421 is provided to an input terminal of the despread demodulator 122 of the receiver 12a. The HPF 421 blocks an information signal band of the original input data. The LPF 423 is provided to an output terminal of the despread demodulator 122. The LPF 423 passes the information signal band of the original input data.

By providing the HPF 411 as described above in the communications system 2 shown in FIG. 3, overlaying of spectra of the input and output signals obtained from the despread demodulator 122 is avoided. Therefore, noise interference due to leakage of the signal from the despread demodulator 122 is considerably reduced and the receiving sensitivity is remarkably improved.

FIGS. 4A-4D show signal spectra generated through the spread modulation and demodulation operations performed by the communications system 2 shown in FIG. 3. In FIGS. 4A-4D, a horizontal line indicates frequency and a vertical line indicates energy spectral density.

Figure 4A:
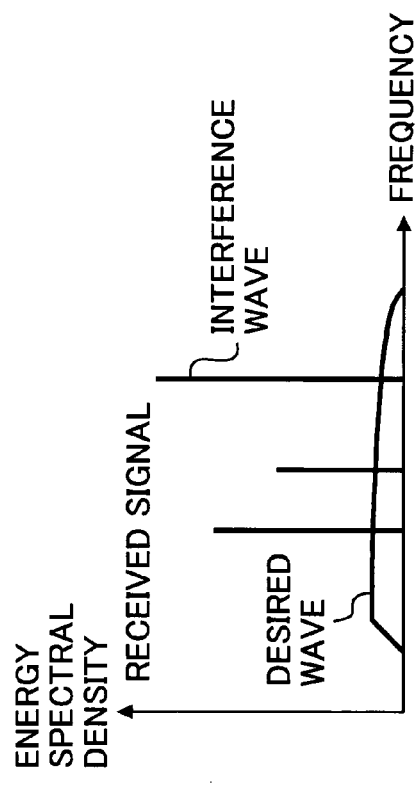
FIGS. 4A-4D are graphs showing spectra generated in exemplary operations of the communications system shown in FIG. 3.
Figure 4B:
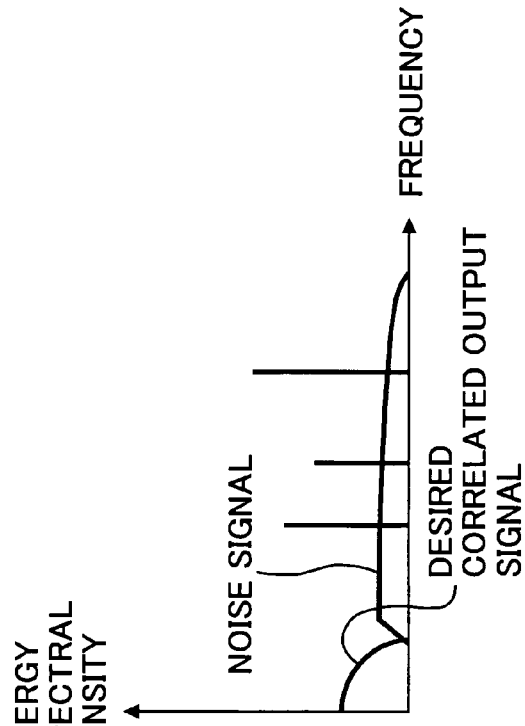
Figure 4C:
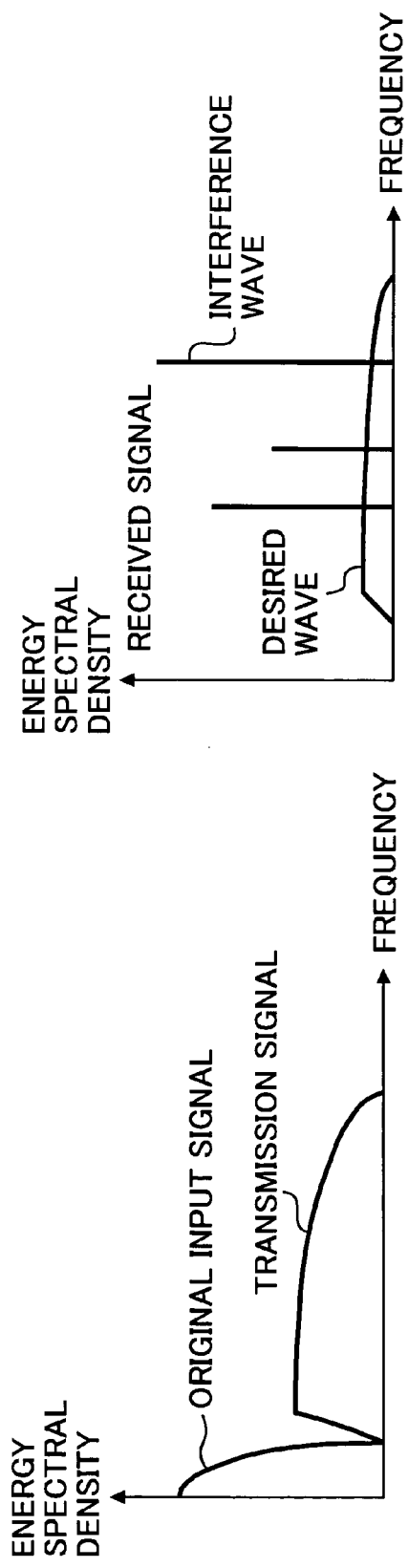
Figure 4D:
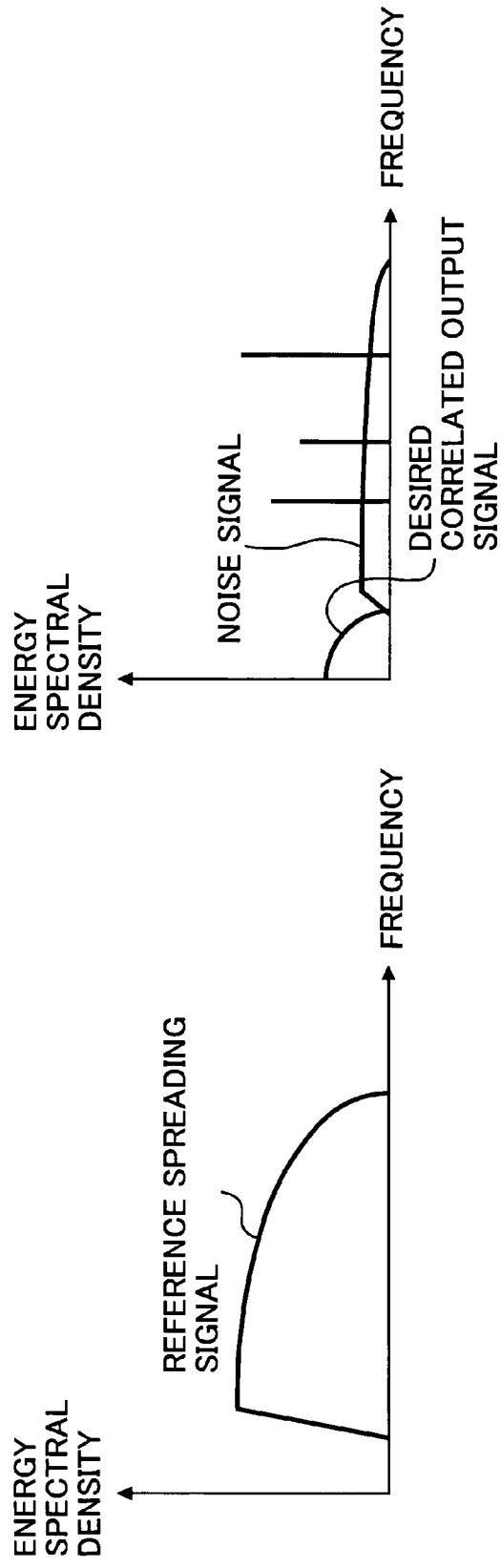

FIG. 4A shows a signal spectrum obtained at an output end of the amplifier 112 (an input end of the HPF 411) in the communications system 2 which has improved receiving sensitivity, shown in FIG. 3. FIG. 4B shows a signal spectrum obtained at an input end of the despread demodulator 122 (an output end of the HPF 421). FIG. 4C shows a spectrum of a reference spreading signal in the despread demodulator 122. FIG. 4D shows a spectrum of a signal which correlates to the original data and is obtained at an output end of the despread demodulator 122.

In the communications system 2, the signal is filtered through the HPF 411 and is output from the transmitter 11a. Therefore, a signal in a band of the desired correlated output signal is removed from the transmission signal. Since the HPF 421 is provided to a stage before the despread demodulator 122 in the receiver 12a, the signal in the band of the desired correlated output signal, and the interference signal and external noises are removed. Therefore, interference signals or external noise do not affect the correlated output signal.

Since the reference spreading signal of the despread demodulator 122 is also filtered through the HPF 421 before reaching the correlator, substantially all interference signals are removed from the band of the desired correlated output signal. Therefore, the reference spreading signal gives no negative influences on the correlated output signal. As a result, the correlated output signal is divided into a desired correlated output signal in the band of the desired correlated output signal and a noise element in a wider frequency band, as shown in FIG. 4D. Therefore, only the desired correlated output signal is detected by the LPF 423. Then, by amplifying only the desired signal by the automatic gain control amplifier 123, a signal in which an amount of noise is considerably reduced is reproduced. Therefore, the receiving sensitivity and the communication quality is remarkably improved. It should be notes that since the HPF 421 is provided in the receiver 12*a*, the HPF 411 in the transmitter 11*a* may not necessarily be required.

Figure 5:
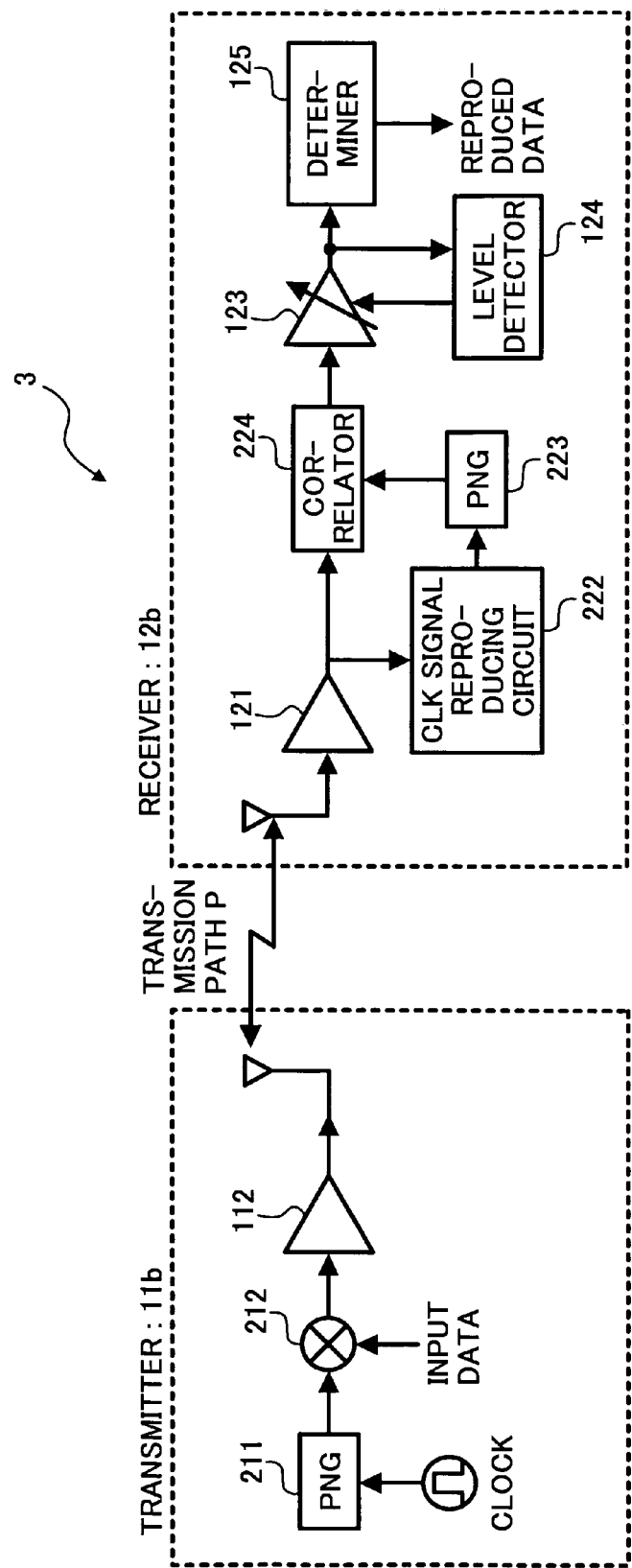
FIG. 5 is an illustration showing a communications system according to another exemplary embodiment of the present invention.

Referring now to FIG. 5, a communications system 3 according to another exemplary embodiment of the present invention is now discussed. The communications system 3 of FIG. 5 is similar to the communications systems 1 (FIG. 1) and 2 (FIG. 3), except that the communications system 3 of FIG. 5 employs a direct sequence spread spectrum (also referred to as "DS-SS") technique for spreading and modulating data. The communications system 3 uses a pseudo random noise code (PN code) having a fixed bandwidth for multiplying the original input data so as to spread a frequency bandwidth of a stream of the input signal data, modulate and then transmit the data to an external receiver. With this technique, the communications system 3 changes a digital signal (i.e., the original input data) having a narrow bandwidth and high energy spectral density to a digital signal having a wide bandwidth and low energy spectral density.

In the communications system 3 of FIG. 5, a transmitter 11*b* includes a pseudo noise code generator 211 (PNG), a multiplier 212, and the amplifier 112. A receiver 12*b* includes the low-gain amplifier 121, a clock signal reproducing circuit 222, a pseudo noise code generator (PNG) 223, correlator 224, the automatic gain control amplifier 123, the level detector 124 and the determiner 125.

The pseudo noise code generator (PNG) 211 of the transmitter 11*b* receives an input clock signal and generates a pseudo noise code. The multiplier 212 multiplies the original input data by the pseudo noise code to generate a modulated signal. The amplifier 112 amplifies the modulated signal to transmit as a baseband signal by wired or wireless transmission.

The low-gain amplifier 121 of the receiver 12*b* receives the modulated signal from the amplifier 112 and amplifies the signal to a level in which a SN ratio is not deteriorated. Then, based on the amplified signal, the clock signal reproducing circuit 222 reproduces a clock signal and subsequently the pseudo noise code generator 223 generates a pseudo noise code. The correlator 224 processes the pseudo noise code generated by the pseudo noise code generator 223 to demodulate the amplified signal, which is sent by the low-gain amplifier 121. The automatic gain control amplifier 123, having a wide dynamic range, amplifies the demodulated signal to a signal having a predetermined amplitude level in the wide dynamic range. The determiner 125 determines the signal to reproduce the original input data.

Figure 6:
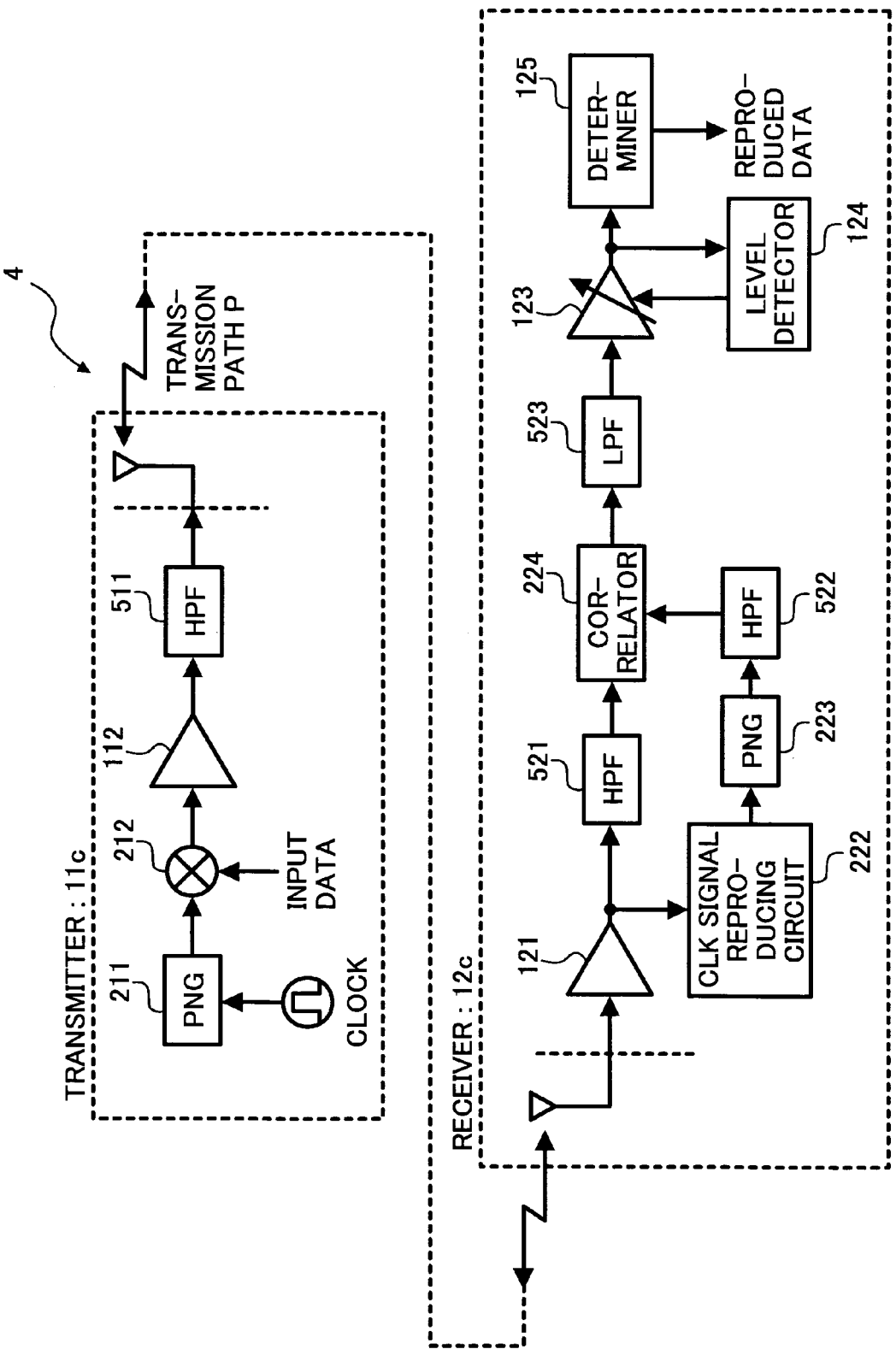
FIG. 6 is an illustration showing a communications system according to another exemplary embodiment having further improved receiving sensitivity based on the communications systems of FIGS. 3 and 5.

Referring now to FIG. 6, a communications system 4 has further improved receiving sensitivity based on the communications systems 2 (FIG. 3) and 3 (FIG. 5). In FIG. 6, the communications system 4 is provided with an HPF 511 at a stage after the amplifier 112 of the transmitter 11*c* for blocking an information signal band of the original input data.

In the receiver 12*c*, an HPF 521 is provided to an input terminal of the correlator 224 for receiving an amplified signal in order to block an information signal band of the original input data. An HPF 522 is also provided to an input terminal of the correlator 224 for receiving a pseudo noise code in order to block the information signal band of the original input data. Further, an LPF 523 is provided to an output terminal of the correlator 224 in order to pass the information signal band of the original input data.

In the communications system 4 shown in FIG. 6, the HPFs 511, 521, 522 and the LPF 523 reduce an amount of noise and further improve the signal receiving sensitivity of the system 4.

Referring to FIG. 7, a communications system 5 is based on the communications system 3 of FIG. 5 is illustrated. The communications system 5 further improves the signal receiving sensitivity by employing a DS-SS using double pseudo noise codes.

In the communications system 5 shown in FIG. 7, a transmitter 11*d* includes a frequency divider 311, first pseudo noise code generator (PNG) 3121, second pseudo noise code generator (PNG) 3122, first multiplier 3131, second multiplier 3132 and the amplifier 112. The frequency divider 311 divides a frequency of an input clock signal. The first pseudo noise code generator (PNG) 3121 generates a first pseudo noise code according to a frequency-divided input clock signal by the frequency divider 311. The second pseudo noise code generator (PNG) 3122 generates a second pseudo noise code according to the input clock signal. The first multiplier 3131 multiplies the original input data by the first pseudo noise code generated by the first pseudo noise code generator (PNG) 3121. The second multiplier 3132 multiplies the second pseudo noise code generated by the second pseudo noise code generator 3122, by a signal obtained from the first multiplier 3131.

A receiver 12*d* of the communications system 5 includes a low-gain amplifier 121, clock signal reproducing circuit 322, frequency divider 323, third pseudo noise code generator 3242, fourth pseudo noise code generator 3241, first correlator 3251, first automatic gain control amplifier 3261, second correlator 3252, second automatic gain control amplifier 3262 and the determiner 125. The frequency divider divides a frequency of a clock signal reproduced by the clock signal reproducing circuit 322. The third pseudo noise code generator 3242 corresponds to the second pseudo noise code generator 3122 and generates a pseudo noise code according to the clock signal reproduced by the clock signal reproducing circuit 322. The fourth pseudo noise code generator 3242 corresponds to the first pseudo noise code generator 3121 and generates a pseudo noise code according to the frequency-divided clock signal generated by the frequency divider 323. The first correlator 3251 receives the signal amplified by the low-gain amplifier 121 and the pseudo noise code obtained from the third pseudo noise code generator 3242. The first automatic gain control amplifier 3261 receives a signal output by the first correlator 3251. The second correlator 3252 receives a signal obtained from the automatic gain control amplifier 3261 and a signal obtained from the fourth pseudo noise code generator 3241. The second automatic gain control amplifier 3262 receives a signal obtained from the second correlator 3252. The determiner 125 receives a signal obtained from the second automatic gain control amplifier 3262, reproduces original input data based on the amplified signal, and outputs the reproduced data.

In the transmitter 11*d*, the frequency divider 311 receives the input clock signal, divides the frequency thereof, and transmits the frequency-divided signal to the first pseudo noise code generator (PNG) 3121. The first pseudo noise code generator (PNG) 3121 generates a first pseudo noise code according to the divided clock signal and transmits the generated PN code to the multiplier 3131. The multiplier 3131 multiplies the original input data by the pseudo noise code to generate a primary modulated signal. The second pseudo noise code generator (PNG) 3122 receives the input clock signal to generate a second pseudo noise code and transmits the generated pseudo noise code to the second multiplier 3132. The second multiplier 3132 multiplies the pseudo noise code from the second pseudo noise code generator 3122 by the primary modulated signal from the multiplier 3131 to generate a secondary modulated signal. The amplifier 112 amplifies the secondary spread modulation signal and transmits the signal as a baseband signal by wired or wireless transmission.

In the receiver 12d, the low-gain amplifier 121 receives the spread modulated signal from the amplifier 112 and amplifies the signal to a level in which a SN ratio is not deteriorated. Then, based on the amplified signal, a clock signal is reproduced by the clock signal reproducing circuit 322 and a third pseudo noise code which corresponds to the second pseudo noise code generated by the transmitter 11d is generated by the third pseudo noise code generator 3242. The third pseudo noise code is processed by the first correlator 3251 to perform a primary spread modulation to the amplified signal which is sent from the low-gain amplifier 121. On the other hand, the frequency divider 323 sends the input clock signal to the fourth pseudo noise code generator 3241 and the fourth noise code generator 3241 generates a fourth pseudo noise code which corresponds to the first pseudo noise code generated by the transmitter. The fourth pseudo noise code is processed by the second correlator 3252 to perform a secondary spread modulation to the amplified signal sent to the second automatic gain control amplifier 3262. The second automatic gain control amplifier 3262 amplifies the signal to a signal having a predetermined amplitude level in a wide dynamic range. The signal from the second automatic gain control amplifier 3262 is input to the determiner 125. The determiner 125 reproduces data based on the received signal and outputs the reproduced data.

Figure 8A:
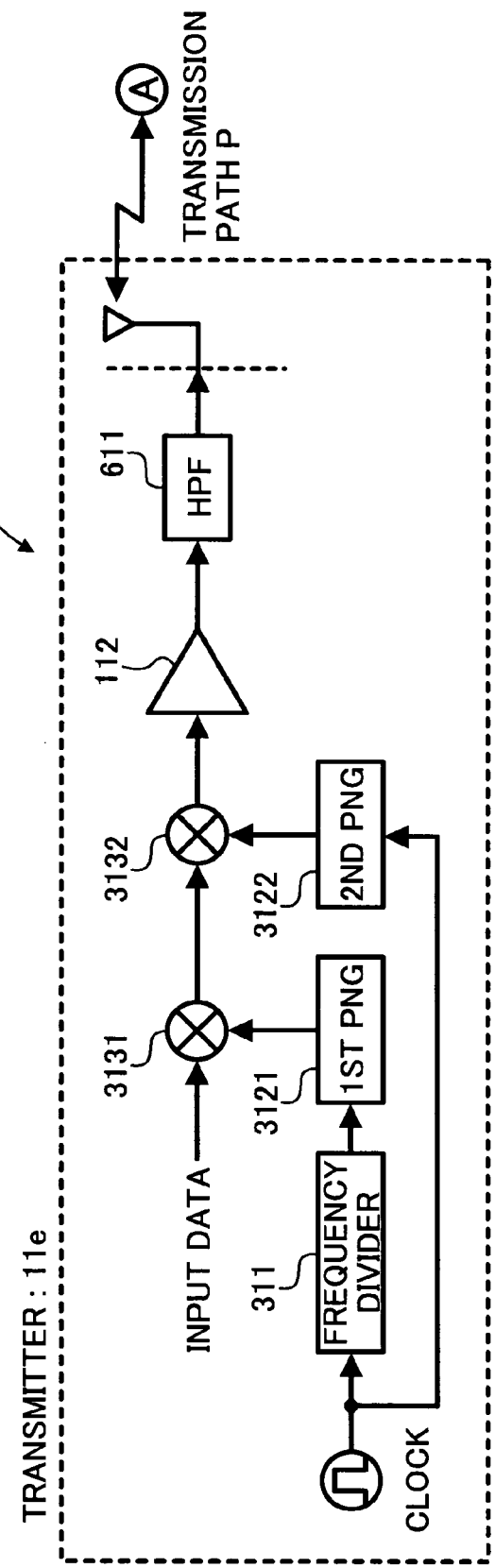
FIG. 8 (FIGS. 8A and 8B) shows a communications system according to another example having further improved receiving sensitivity based on the communications system of FIG. 7.
Figure 8B:
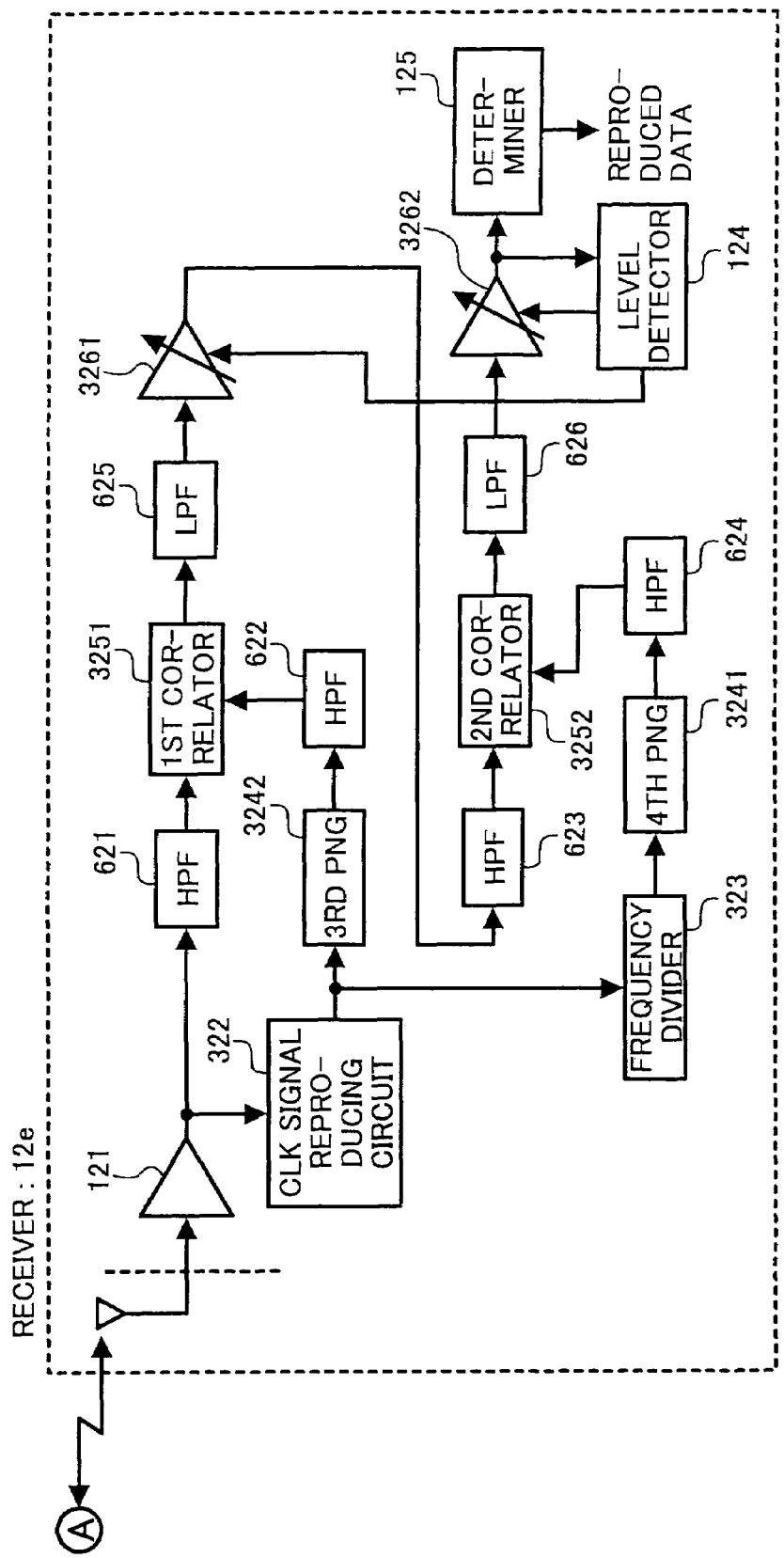

Referring to FIG. 8 (i.e., FIGS. 8A and 8B), a communications system 6 having further improved receiving sensitivity based on the communications system 5 of FIG. 7 is illustrated. In FIG. 8A, the communications systems 6 is provided with an HPF 611 at a stage after the amplifier 112 of the transmitter 11e for blocking an information signal band of the original input data.

In the receiver 12e of FIG. 8B, an HPF 621 is provided to an input terminal of the first correlator 3251 for receiving the signal amplified by the low-gain amplifier 121 in order to block an information signal band of the original input data which has been processed through the primary spreading. An HPF 622 is also provided at the input terminal of the first correlator 3251 for receiving a pseudo noise code generated by the third pseudo noise code generator 3242 in order to block an information signal band of the original input data that has been processed through the primary spreading. Further, an LPF 625 is provided to an output terminal of the first correlator 3251 in order to pass the information signal band of the input data which has been processed through the primary spreading.

An HPF 623 is provided at an input terminal of the second correlator 3252 for receiving the signal amplified by the amplifier 3261 in order to block an information signal band of the original input data before the primary spreading. An HPF 624 is also provided at the input terminal of the second correlator 3252 for receiving a pseudo noise code generated by the fourth pseudo noise code generator 3241 in order to block the information signal band of the original input data before the primary spreading. Further, an LPF 626 is provided at an output terminal of the second correlator 3252 in order to pass the information signal band of the input data before the primary spreading.

The processes and devices described above illustrate preferred methods and typical devices of many that could be used and produced. The above description and drawings illustrate embodiments, which achieve the objects, features, and advantages of the present invention. However, it is not intended that the present invention be strictly limited to the above-described and illustrated embodiments. Any modification, though presently unforeseeable, of the present invention that comes within the spirit and scope of the following claims should be considered part of the present invention.

What is claimed as new and desired to be protected by Letters Patent of the United States is:

1. A receiver for ultra wideband communications, comprising:
    a low-gain amplifier for amplifying a spread signal received from an external transmitter to a predetermined gain level;
    a clock signal reproducing circuit for reproducing an input clock signal based on the amplified spread signal obtained from the low-gain amplifier;
    a pseudo noise code generator for generating a pseudo noise code based on the reproduced input clock signal obtained from the clock signal reproducing circuit;
    a correlator for demodulating the amplified spread signal obtained from the low-gain amplifier according to the pseudo noise code generated by the pseudo noise code generator;
    an automatic gain control amplifier for amplifying the demodulated signal obtained from the correlator to a signal having a wide dynamic range and a constant amplitude level; and
    a determiner for processing the amplified signal obtained from the automatic gain control amplifier to reproduce original input data contained in the spread signal.

2. The receiver for ultra wideband communications according to claim 1, further comprising:
    a first high pass filter for receiving the amplified spread signal and blocking an information signal band at an input terminal of the correlator;
    a second high pass filter for receiving the pseudo noise code and blocking an information signal band at the input terminal of the correlator; and
    a low pass filter for passing in the information signal band at an output terminal of the correlator.

3. A receiver for ultra wideband communications, comprising:
    first amplifying means for amplifying a spread signal received from an external transmitter to a predetermined gain level;
    reproducing means for reproducing an input clock signal based on the amplified spread signal obtained from the first amplifying means;
    generating means for generating a pseudo noise code based on the reproduced input clock signal obtained from the reproducing means;
    correlating means for demodulating the amplified spread signal obtained from the first amplifying means according to the pseudo noise code generated by the generating means;
    second amplifying means for amplifying the demodulated signal obtained from the correlating means to a signal having a wide dynamic range and a constant amplitude level; and
    determining means for processing the amplified signal obtained from the second amplifying means to reproduce original input data contained in the spread signal.

4. The receiver for ultra wideband communications according to claim 3, further comprising:
    a first high pass filtering means for receiving the amplified spread signal and blocking an information signal band of the original input data at an input terminal of the correlating means;

a second high pass filtering means for receiving the pseudo noise code and blocking the information signal band of the original input data at the input terminal of the correlating means; and a low pass filtering means for passing the information signal band of the original input data at an output terminal of the correlating means.

5. A method of reproducing original data for ultra wideband communications, comprising the steps of:

amplifying a spread signal received from an external transmitter;

reproducing an input clock signal based on the amplified spread signal;

generating a pseudo noise code based on the reproduced input clock signal;

demodulating the amplified spread signal according to the pseudo noise code;

amplifying the demodulated signal automatically to a signal having a constant amplitude level; and reproducing original input data based on the amplified signal having the constant level of amplitude.

6. The method of reproducing original data for ultra wideband communications according to claim 5, further comprising the steps of:

performing a first high pass filtering operation for blocking an information signal band of the original input data with respect to the amplified spread signal;

performing a second high pass filtering operation for blocking the information signal band of the original input data with respect to the pseudo noise code; and performing a low pass filtering operation for passing the information signal band of the original input data with respect to the demodulated spread signal.

7. An ultra wideband communications system, comprising:

a transmitter for ultra wideband communications, said transmitter comprising:

a pseudo noise code generator for generating a pseudo noise code according to an input clock signal;

a multiplier for multiplying original input data by the pseudo noise code and producing a spread signal; and an amplifier for amplifying the spread signal, wherein the amplified signal obtained from the amplifier is transmitted as a baseband signal by one of a wired and wireless transmission, and a receiver for ultra wideband communications, said receiver comprising:

a low-gain amplifier for amplifying a spread signal received from an external transmitter to a predetermined gain level;

a clock signal reproducing circuit for reproducing an input clock signal based on the amplified spread signal obtained from the low-gain amplifier;

a pseudo noise code generator for generating a pseudo noise code based on the reproduced input clock signal obtained from the clock signal reproducing circuit;

a correlator for demodulating the amplified spread signal obtained from the low-gain amplifier according to the pseudo noise code generated by the pseudo noise code generator;

an automatic gain control amplifier for amplifying the demodulated signal obtained from the correlator to a signal having a wide dynamic range and a constant level of amplitude; and a determiner for processing the amplified signal obtained from the automatic gain control amplifier to reproduce original input data contained in the spread signal.

8. An ultra wideband communications system, comprising:

transmitting means for ultra wideband communications, said transmitting means comprising:

generating means for generating a pseudo noise code according to an input clock signal;

multiplying means for multiplying original input data by the pseudo noise code and producing a spread signal; and amplifying means for amplifying the spread signal, wherein the amplified signal obtained from the amplifying means is transmitted as a baseband signal by one of a wired and wireless transmission; and receiving means for ultra wideband communications, said receiving means comprising:

first amplifying means for amplifying a spread signal received from an external transmitter to a predetermined gain level;

reproducing means for reproducing an input clock signal based on the amplified spread signal obtained from the first amplifying means;

generating means for generating a pseudo noise code based on the reproduced input clock signal obtained from the reproducing means;

correlating means for demodulating the amplified spread signal obtained from the first amplifying means according to the pseudo noise code generated by the generating means;

second amplifying means for amplifying the demodulated signal obtained from the correlating means to a signal having a wide dynamic range and a constant level of amplitude; and determining means for processing the amplified signal obtained from the second amplifying means to reproduce original input data contained in the spread signal.

9. A method of performing ultra wideband communications, comprising the steps of:

generating a pseudo noise code according to an input clock signal;

multiplying original input data by the pseudo noise code and producing a spread signal;

amplifying the spread signal;

transmitting the amplified spread signal obtained from the amplifying step as a baseband signal by one of a wired and wireless transmission;

receiving the transmitted spread signal;

amplifying the transmitted spread signal to a predetermined gain level;

reproducing the input clock signal based on the amplified spread signal;

generating a pseudo noise code based on the reproduced input clock signal;

demodulating the amplified spread signal according to the pseudo noise code;

amplifying the demodulated signal to a signal having a constant amplitude level; and reproducing original input data based on the amplified signal having the constant amplitude level.

10. A transmitter for ultra wideband communications, comprising:

a frequency divider for dividing a frequency of an input clock signal;

a first pseudo noise code generator for generating a first pseudo noise code according to the frequency-divided input clock signal obtained from the frequency divider;

a second pseudo noise code generator for generating a second pseudo noise code according to the input clock signal;

a first multiplier for multiplying original input data by the first pseudo noise code and producing a primary spread signal;

a second multiplier for multiplying the primary spread signal by the second pseudo noise code and producing a secondary spread signal; and an amplifier for amplifying the secondary spread signal, wherein the amplified signal obtained from the amplifier is transmitted as a baseband signal by one of a wired and wireless transmission.

11. The transmitter for ultra wideband communications according to claim 10, further comprising a high pass filter for blocking an information signal band of the original input data in one of a stage before and a stage after the amplifier.

12. A receiver for ultra wideband communications, comprising:

a low-gain amplifier for amplifying a spread signal received from an external transmitter to a predetermined gain level;

a clock signal reproducing circuit for reproducing an input clock signal based on the amplified spread signal obtained from the low-gain amplifier;

a third pseudo noise code generator corresponding to a second pseudo noise code generator provided at the external transmitter for generating a third pseudo noise code that corresponds to a second pseudo noise code generated by the transmitter based on the reproduced input clock signal obtained from the clock signal reproducing circuit;

a frequency divider for dividing a frequency of the reproduced input clock signal obtained from the clock signal reproducing circuit;

a fourth pseudo noise code generator corresponding to a first pseudo noise code generator provided at the external transmitter for generating a fourth pseudo noise code that corresponds to a first pseudo noise code generated by the transmitter based on the frequency-divided input clock signal obtained from the frequency divider;

a first correlator for performing primary demodulation to the amplified spread signal obtained from the low-gain amplifier based on the third pseudo noise code;

a first automatic gain control amplifier for amplifying the primary demodulated signal obtained from the first correlator;

a second correlator for performing secondary demodulation to the amplified signal obtained from the first automatic gain control amplifier based on the fourth pseudo noise code;

a second automatic gain control amplifier for amplifying the secondary demodulated signal obtained from the second correlator to a signal having a constant level; and a determiner for processing the amplified signal obtained from the second automatic gain control amplifier to reproduce original input data contained in the spread signal.

13. The receiver for ultra wideband communications according to claim 12, further comprising:

a first high pass filter for receiving the amplified signal obtained from the low-gain amplifier and blocking an information signal band of the original input data which has been processed through a primary spreading at an input terminal of the first correlator;

a second high pass filter for receiving the pseudo noise code obtained from the third pseudo noise code generator and blocking the information signal band of the original input data which has been processed through the primary spreading at the input terminal of the first correlator;

a first low pass filter for passing the information signal band of the original input data which has been processed through the primary spreading at an output terminal of the first correlator;

a third high pass filter for receiving the amplified signal obtained from the first automatic gain control amplifier and blocking the information signal band of the original input data before the primary spreading at an input terminal of the second correlator;

a fourth high pass filter for receiving the pseudo noise code obtained from the fourth pseudo noise code generator and blocking the information signal band of the original input data before the primary spreading at the input terminal of the second correlator; and a second low pass filter for passing the information signal band of the original input data before the primary spreading at an output terminal of the second correlator.

14. A transmitter for ultra wideband communications, comprising:

dividing means for dividing a frequency of an input clock signal;

first generating means for generating a first pseudo noise code according to the frequency-divided input clock signal obtained from the dividing means;

second generating means for generating a second pseudo noise code according to the input clock signal;

first multiplying means for multiplying original input data by the first pseudo noise code and producing a primary spread signal;

second multiplying means for multiplying the primary spread signal by the second pseudo noise code and producing a secondary spread signal; and amplifying means for amplifying the secondary spread signal, wherein the amplified signal obtained from the amplifying means is transmitted as a baseband signal by one of a wired and wireless transmission.

15. The transmitter for ultra wideband communications according to claim 14, further comprising a high pass filtering means for blocking an information signal band of the original input data in one of a stage before and a stage after the amplifying means.

16. A receiver for ultra wideband communications, comprising:

first amplifying means for amplifying a spread signal received from an external transmitter to a predetermined gain level;

reproducing means for reproducing an input clock signal based on the amplified signal obtained from the first amplifying means;

first generating means for generating a third pseudo noise code that corresponds to a second pseudo noise code generated in the transmitter based on the reproduced input clock signal obtained from the reproducing means;

dividing means for dividing a frequency of the reproduced predetermined clock signal obtained from the reproducing means;

second generating means for generating a fourth pseudo noise code that corresponds to a first pseudo noise code generated by the transmitter based on the frequency-divided input clock signal obtained from the dividing means;

first correlating means for performing primary demodulation to the amplified spread signal obtained from the first amplifying means based on the third pseudo noise code;

second amplifying means for amplifying the primary demodulated signal obtained from the first correlating means;

second correlating means for performing secondary demodulation to the amplified signal obtained from the second amplifying means based on the fourth pseudo noise code;

third amplifying means for amplifying the secondary demodulated signal obtained from the second correlating means to a signal having a constant level; and determining means for processing the amplified signal obtained from the third amplifying means to reproduce original input data contained in the spread signal.

17. The receiver for ultra wideband communications according to claim 16, further comprising:

first high pass filtering means for receiving the amplified signal obtained from the first amplifying means and blocking an information signal band of the original input data which has been processed through a primary spreading at an input terminal of the first correlating means;

second high pass filtering means for receiving the pseudo noise code obtained from the first generating means and for blocking the information signal band of the original input data which has been processed through a primary spreading at the input tenninal of the first correlating means;

first low pass filtering means for passing the information signal band of the original input data which has been processed through the primary spreading at an output terminal of the first correlating means;

third high pass filtering means for receiving the amplified signal obtained from the second amplifying means and for blocking the information signal band of the original input data before the primary spreading at an input terminal of the second correlating means;

fourth high pass filtering means for receiving the pseudo noise code obtained from the second generating means and for blocking the information signal band of the original input data before the primary spreading at the input terminal of the second correlating means; and second low pass filter for passing the information signal band of the original input data before the primary spreading at an output terminal of the second correlating means.

18. A method of producing an input signal for ultra wideband communications, comprising the steps of:

dividing a frequency of an input clock signal;

generating a first pseudo noise code according to the frequency-divided input clock signal;

generating a second pseudo noise code according to the input clock signal;

multiplying original input data by the first pseudo noise code and producing a primary spread signal;

multiplying the primary spread signal by the second pseudo noise code and producing a secondary spread signal; and amplifying the secondary spread signal.

19. The method of producing an input signal for ultra wideband communications according to claim 18, further comprising the steps of:

performing a high pass filtering operation for blocking an information signal band of the original input data in one of stages before and after the amplifier for amplifying the secondary spread signal.

20. A method of reproducing original data for ultra wideband communications, comprising the steps of:

amplifying a spread signal received from an external transmitter;

reproducing an input clock signal based on the amplified spread signal;

generating a third pseudo noise code that corresponds to a second pseudo noise code generated at the transmitter based on the reproduced input clock signal;

dividing a frequency of the reproduced input clock signal;

generating a fourth pseudo noise code that corresponds to a first pseudo noise code generated at the transmitter based on the frequency-divided input clock signal;

performing primary demodulation to the amplified spread signal based on the third pseudo noise code;

amplifying the primary demodulated signal;

performing secondary demodulation to the amplified signal based on the fourth pseudo noise code;

amplifying the secondary demodulated signal to a signal having a constant level; and reproducing original input data based on the amplified signal having a constant level of amplitude.

21. A method of reproducing original input data from an input secondary spread signal for ultra wideband communications, comprising the steps of:

performing a first high pass filtering operation for blocking an information signal band of the original input data which has been processed through a primary spreading with respect to the input secondary spread signal;

performing a second high pass filtering operation for blocking the information signal band of the input data which has been processed through the primary spreading with respect to a third pseudo noise code that corresponds to a second pseudo noise code generated by an external transmitter;

performing a first low pass filtering operation for passing the information signal band of the original input data which has been processed through the primary spreading with respect to a primary demodulated signal demodulated based on the outputs from the first and second high pass filtering operations;

performing a third high pass filtering operation for blocking the information signal band of the original input data before the primary spreading with respect to an output from the second amplifying means;

performing a fourth high pass filtering operation for blocking the information signal band of the original input data before the primary spreading with respect to a fourth pseudo noise code that corresponds to a first pseudo noise code generated by the transmitter; and performing a second low pass filtering operation for passing the information signal band of the original input data before the primary spreading with respect to the secondary demodulated signal based on the outputs from the third and fourth high pass filtering operations.

22. An ultra wideband communications system, comprising:

a transmitter for ultra wideband communications, said transmitter comprising:

a frequency divider for dividing a frequency of an input clock signal;

a first pseudo noise code generator for generating a first pseudo noise code according to the frequency-divided input clock signal obtained from the frequency divider;

a second pseudo noise code generator for generating a second pseudo noise code according to the input clock signal;

a first multiplier for multiplying original input data by the first pseudo noise code and producing a primary spread signal;

a second multiplier for multiplying the primary spread signal by the second pseudo noise code and producing a secondary spread signal; and an amplifier for amplifying the secondary spread signal, wherein the amplified signal obtained from the amplifier is transmitted as a baseband signal by one of a wired and wireless transmission; and a receiver for ultra wideband communications, said receiver comprising:

a low-gain amplifier for amplifying a spread signal received from an external transmitter to a predetermined gain level;

a clock signal reproducing circuit for reproducing an input clock signal based on the amplified spread signal obtained from the low-gain amplifier;

a third pseudo noise code generator corresponding to the second pseudo noise code generator for generating a third pseudo noise code that corresponds to the second pseudo noise code based on the reproduced input clock signal obtained from the clock signal reproducing circuit;

a frequency divider for dividing a frequency of the reproduced input clock signal obtained from the clock signal reproducing circuit;

a fourth pseudo noise code generator corresponding to the first pseudo noise code generator for generating a fourth pseudo noise code that corresponds to the first pseudo noise code based on the frequency-divided input clock signal obtained from the frequency divider;

a first correlator for performing primary demodulation to the amplified spread signal obtained from the low-gain amplifier based on the third pseudo noise code;

a first automatic gain control amplifier for amplifying the primary demodulated signal obtained from the first correlator;

a second correlator for performing secondary demodulation to the amplified signal obtained from the first automatic gain control amplifier based on the fourth pseudo noise code;

a second automatic gain control amplifier for amplifying the secondary demodulated signal obtained from the second correlator to a signal having a constant level; and a determiner for processing the amplified signal obtained from the second automatic gain control amplifier to reproduce original input data contained in the spread signal.

23. An ultra wideband communications system, comprising:

transmitting means for ultra wideband communications, said transmitting means comprising:

dividing means for dividing a frequency of an input clock signal;

first generating means for generating a first pseudo noise code according to the frequency-divided input clock signal obtained from the dividing means;

second generating means for generating a second pseudo noise code according to the input clock signal;

first multiplying means for multiplying original input data by the first pseudo noise code and producing a primary spread signal;

second multiplying means for multiplying the primary spread signal by the second pseudo noise code and producing a secondary spread signal; and amplifying means for amplifying the secondary spread signal, wherein the amplified signal obtained from the amplifying means is transmitted as a baseband signal by one of a wired and wireless transmission; and receiving means for ultra wideband communications, said receiving means comprising:

first amplifying means for amplifying a spread signal received from an external transmitter to a predetermined gain level;

reproducing means for reproducing an input clock signal based on the amplified spread signal obtained from the first amplifying means;

first generating means for generating a third pseudo noise code that corresponds to the second pseudo noise code based on the reproduced input clock signal obtained from the reproducing means;

dividing means for dividing a frequency of the reproduced input clock signal obtained from the reproducing means;

second generating means for generating a fourth pseudo noise code that corresponds to the first pseudo noise code based on the frequency-divided input clock signal obtained from the dividing means;

first correlating means for performing primary demodulation to the amplified spread signal obtained from the first amplifying means based on the third pseudo noise code;

second amplifying means for amplifying the primary demodulated signal obtained from the first correlating means;

second correlating means for performing secondary demodulation to the amplified signal obtained from the second amplifying means based on the fourth pseudo noise code;

third amplifying means for amplifying the secondary demodulated signal obtained from the second correlating means to a signal having a constant level; and determining means for processing the amplified signal obtained from the third amplifying means to reproduce original input data contained in the spread signal received from the external transmitter.

24. A method of performing ultra wideband communications, comprising the steps of:

dividing a frequency of an input clock signal;

generating a first pseudo noise code according to the frequency-divided input clock signal;

generating a second pseudo noise code according to the input clock signal;

multiplying original input data by the first pseudo noise code and producing a primary spread signal;

multiplying the primary spread signal by the second pseudo noise code and producing a secondary spread signal;

amplifying the secondary spread signal;

transmitting the amplified secondary spread signal obtained from the amplifying step as a baseband signal by one of a wired and wireless transmission;

receiving the transmitted signal;

amplifying the transmitted spread signal to a predetermined gain level;

reproducing the input clock signal based on the amplified spread signal;

generating a third pseudo noise code that corresponds to the second pseudo noise code according to the reproduced input clock signal;

dividing a frequency of the reproduced input clock signal;

generating a fourth pseudo noise code that corresponds to the first pseudo noise code based on the frequency-divided input clock signal;

performing primary demodulation to the amplified spread signal based on the third pseudo noise code;

amplifying the primary demodulated signal;

performing secondary demodulation to the amplified signal based on the fourth pseudo noise code;

amplifying the secondary demodulated signal to a signal having a constant amplitude level; and reproducing the original input data based on the amplified signal having a constant amplitude level.

25. The method according to claim 24, further comprising the steps of:

performing a high pass filtering operation between the amplifying step and the transmitting step;

performing a high pass filtering operation between the amplifying step and the performing step for primary demodulation;

performing a high pass filtering operation between the generating step for the third pseudo noise code and the performing step for the primary demodulation;

performing a low pass filtering operation between the performing step for the primary demodulation and the amplifying step for the primary demodulated signal;

performing a high pass filtering operation between the amplifying step for the primary demodulated signal and the performing step for secondary demodulation;

performing a high pass filtering operation between the generating step for the fourth pseudo noise code and the performing step for the secondary demodulation; and performing a low pass filtering operation between the performing step for the secondary demodulation and the amplifying step.

* * * * *